Oct. 10, 1939.   C. M. EASON   2,175,383
HOIST CLUTCH AND BRAKE MECHANISM
Filed July 19, 1937   5 Sheets-Sheet 2
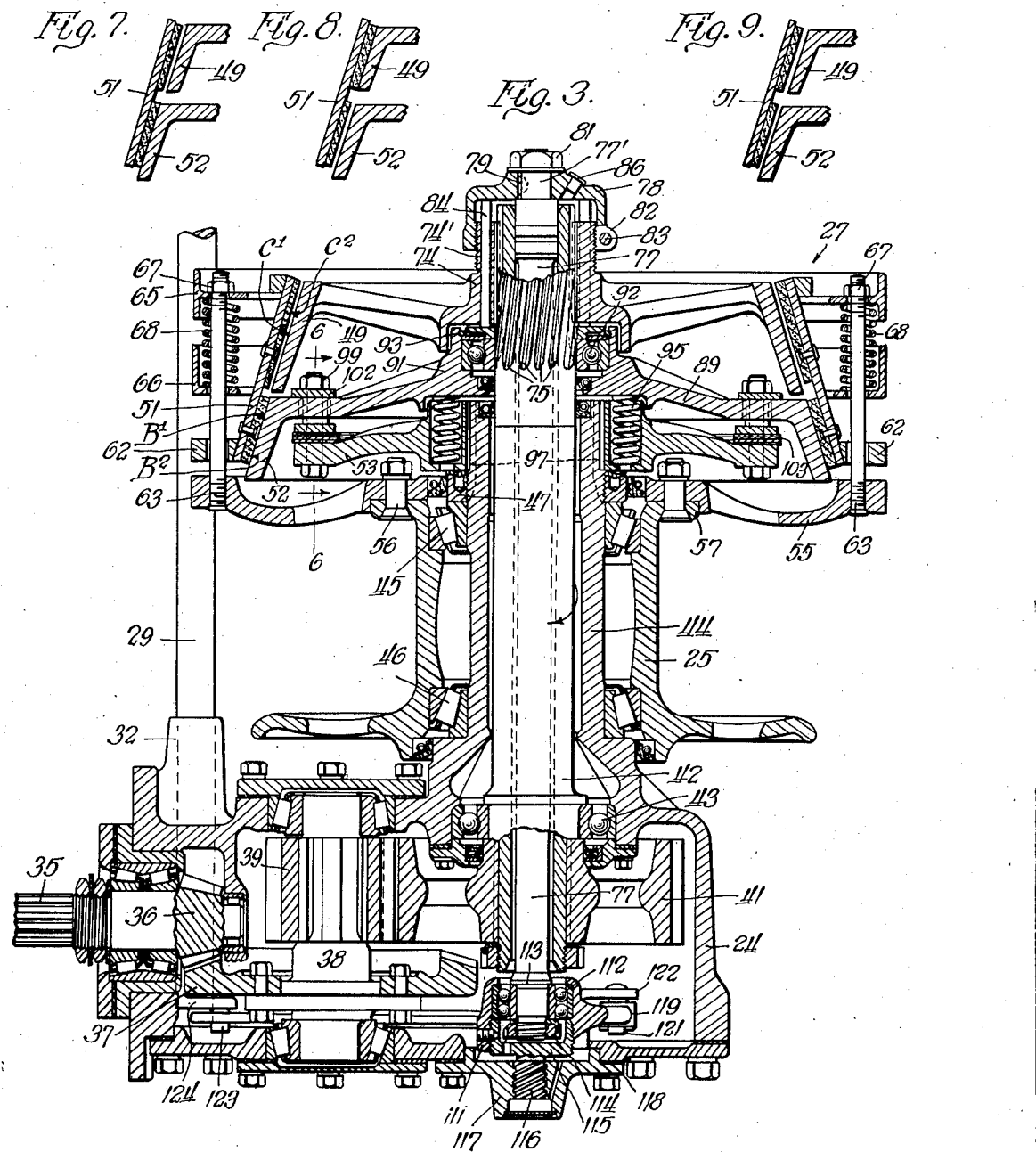
Inventor
Clarence M. Eason
By Brown, Jackson, Boettcher & Dienner
Attys

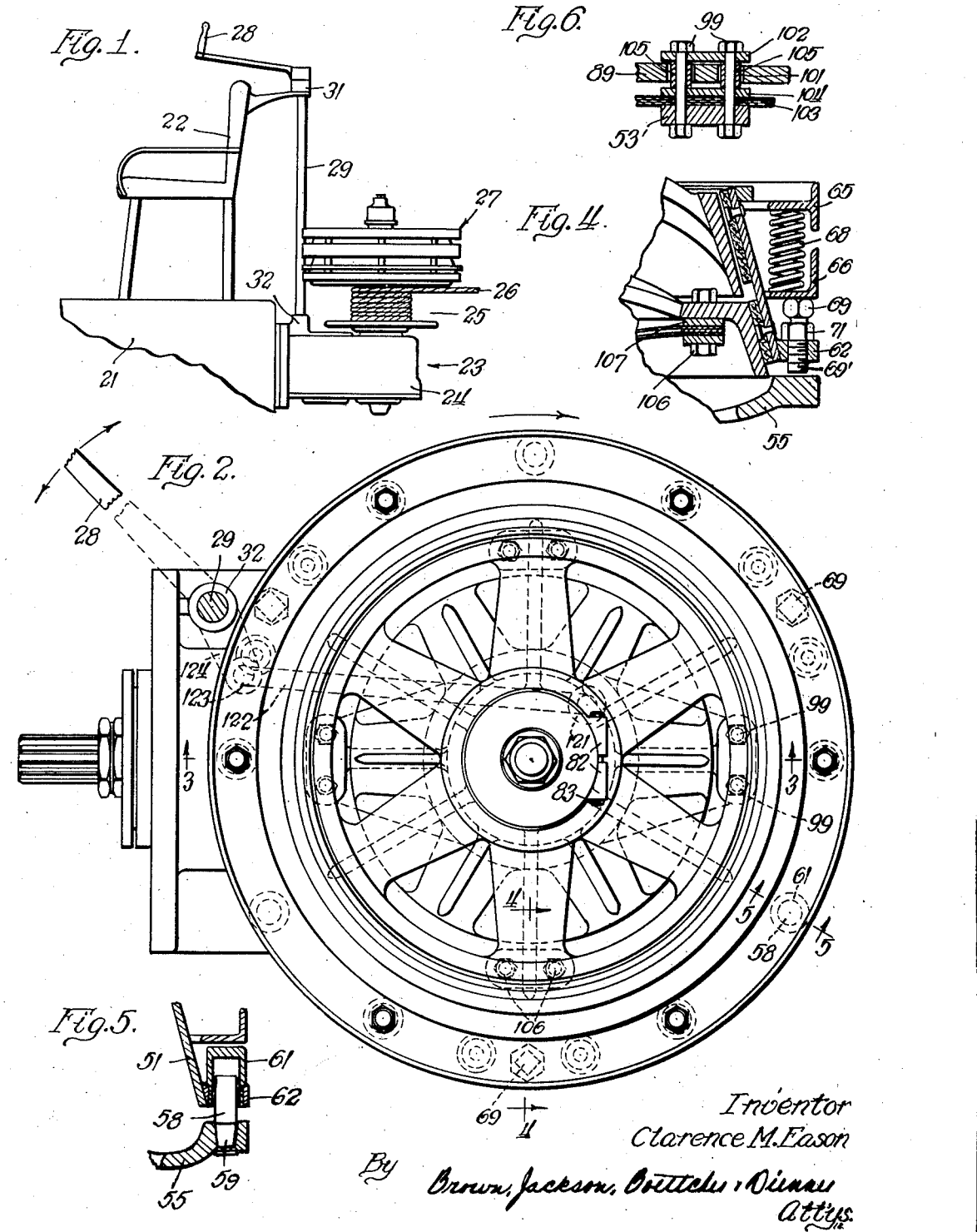

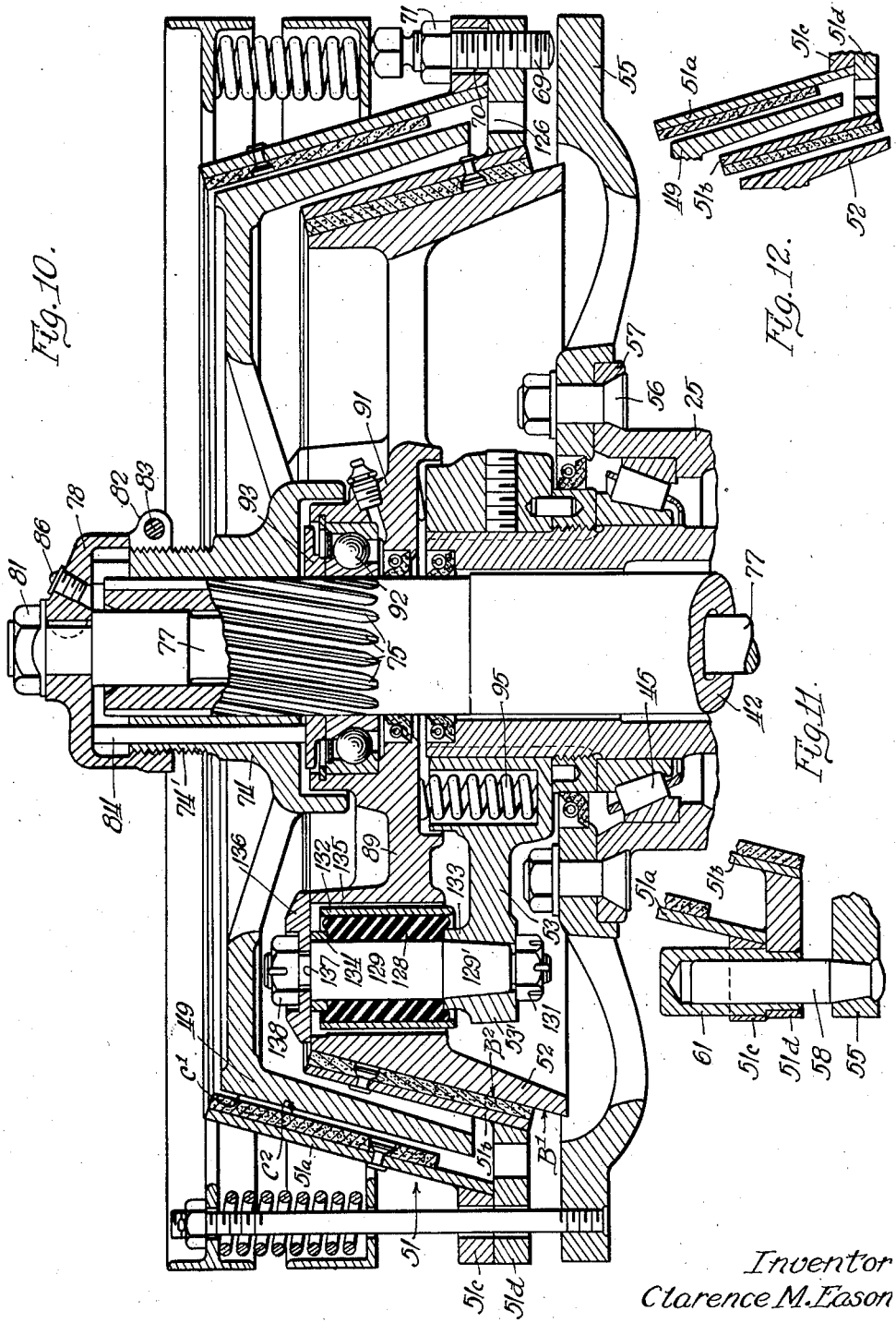

Oct. 10, 1939.  C. M. EASON  2,175,383
HOIST CLUTCH AND BRAKE MECHANISM
Filed July 19, 1937  5 Sheets-Sheet 4
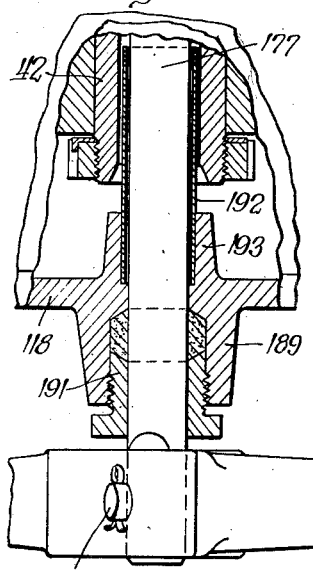
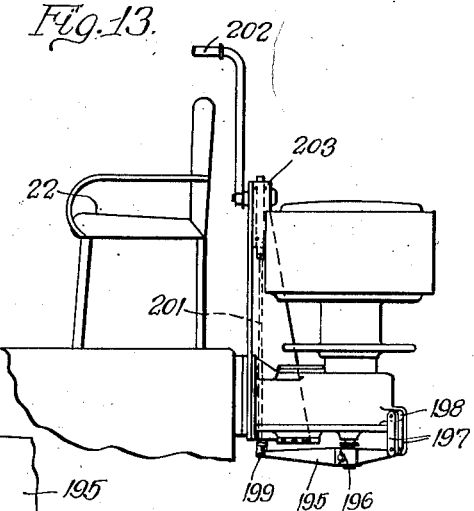
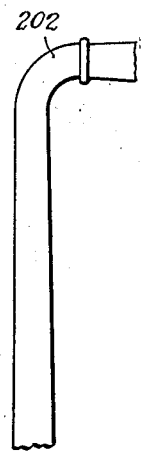
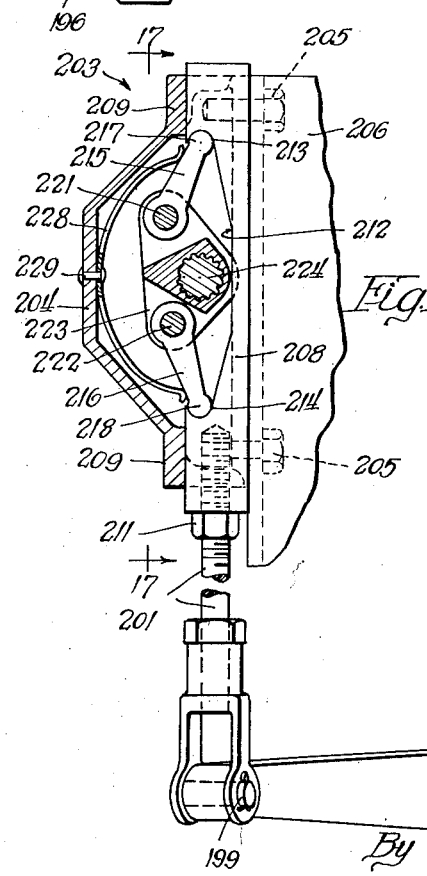
Inventor
Clarence M. Eason
By Arrow, Jackson, Buttchu & Ouun
attys

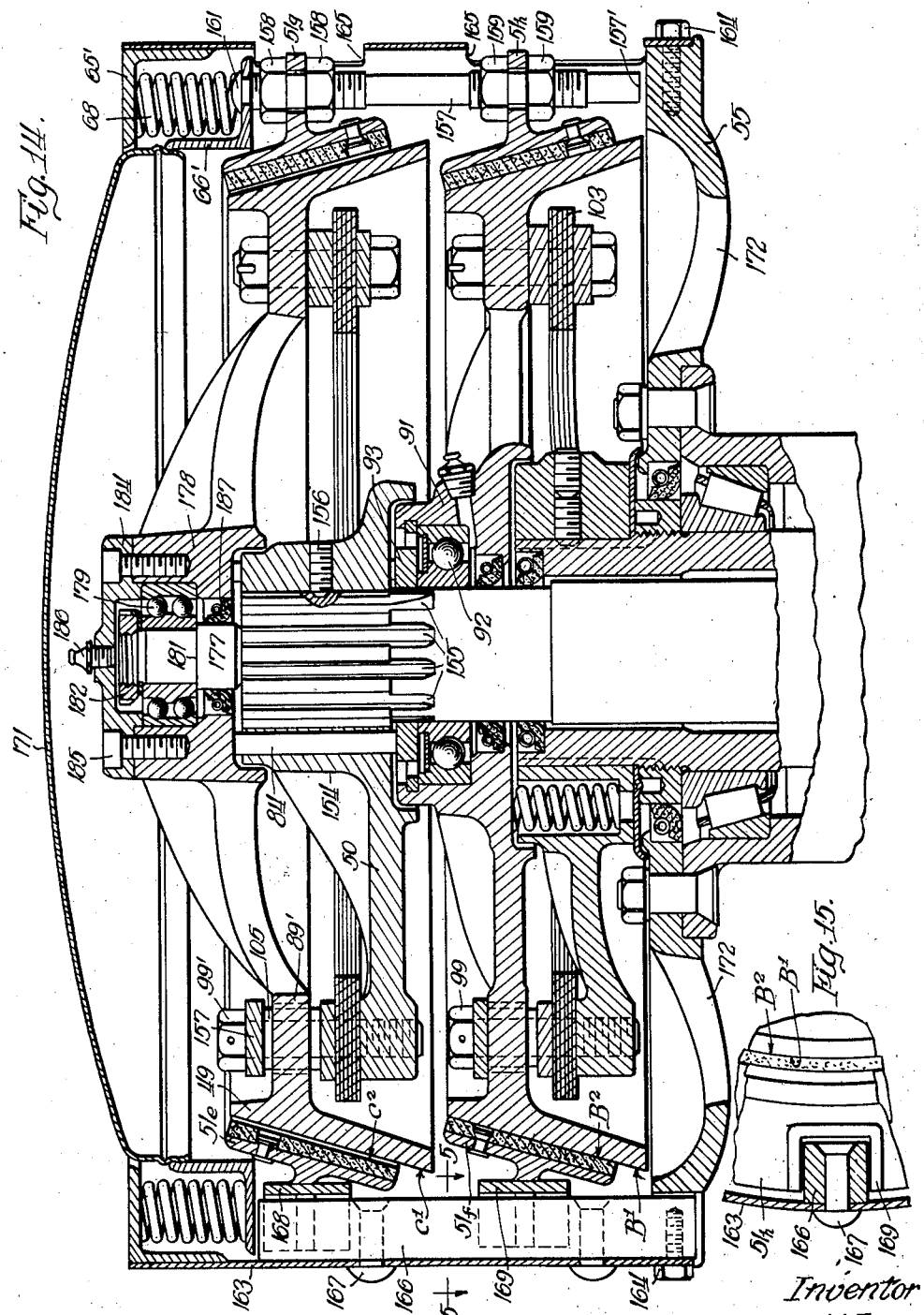

Patented Oct. 10, 1939

2,175,383

UNITED STATES PATENT OFFICE 2,175,383

HOIST CLUTCH AND BRAKE MECHANISM

Clarence M. Eason, Waukesha, Wis., assignor to Industrial Clutch Company, Waukesha, Wis., a corporation of Wisconsin Application July 19, 1937, Serial No. 154,383

34 Claims. (Cl. 192—18)

The present invention relates to a combined clutch and brake mechanism which has its principal field of utility in connection with hoists, winches and other machines handling a gravity impelled load or other continuously acting, unidirectional load. However, within its broader aspects, this improved clutch and brake mechanism can also be employed in other machines wherein the load is not continuously acting, or wherein the load may even act in opposite directions.

The disclosure of the present application constitutes a modification of the disclosure shown in my copending application Serial No. 148,845, filed June 18, 1937.

In operating a hoist to raise, hold and lower a gravity load, it is of the utmost importance that the load be prevented from accidentally dropping. Loss of control of the hoisting drum, even for only a moment, can be very hazardous to life and equipment. This requires that a reliable control be exercised over the clutch and brake of the hoist. Furthermore, control must be sufficiently delicate to provide for accurate movement of the load, and also to avoid the possibility of stalling the source of power. For example, where the hoist is holding a suspended load at one level with the brake set, and it is desired to raise the load to a predetermined higher level and to hold it there for a short time and then to lower it at a controlled speed, it is necessary to perform at least three distinct control operations of the clutch and brake devices. The first operation of starting the transmission of power to the load requires that the clutch and brake be so operated that the clutch takes hold of the load before the brake lets go of the load. The second operation of stopping the transmission of power to the load and holding the load at the predetermined higher level requires that the brake and clutch be so operated that the brake takes hold of the load before the clutch lets go of the load. In the third operation of lowering the load at a controlled speed, the brake must be released just sufficiently to permit lowering of the load but to keep it under control.

Heretofore, the general practice has been to have the clutch and the brake each responsive to a separate control lever, and to rely upon the operator's skillful manipulation of these two levers to obtain the desired reliability and delicacy of control. One objection to this practice is that it leaves the reliability of control entirely open to human error, particularly in the selective operation of the two levers when starting and stopping the transmission of power to the load. Another objection is that the necessity of having to selectively actuate two levers adds to the duties necessary to be performed by the operator, which may be very numerous in some machines, such as power excavators, where control operations over different mechanisms have to be performed in close sequence.

Prior attempts to place the brake and the clutch both under the control of a single lever have not proven satisfactory. In one typical prior construction, when the control lever is in one extreme position the clutch is engaged and the brake is released, and when the lever is in the other extreme position the clutch is released and the brake is engaged. However, in shifting from one position to the other, the lever necessarily passes through a neutral or intermediate position where the hoisting drum is disconnected from both the clutch and the brake and hence is free to drop the load. Even though the shift is made with great rapidity, the momentary loss of control of the drum when the lever passes through this free neutral position is sufficient to make such a device impracticable for most hoist situations.

The general object of the present invention is to provide improved clutch and brake mechanism in which an interdependent relation exists between the clutch and brake functions in the operations of starting and stopping the transmission of power to the load, but in which the brake function is made independent of the clutch function for the operation of lowering the load at a controlled speed. That is to say, in starting the transmission of power, the release of the brake surfaces is made directly dependent upon the prior engagement of the clutch surfaces, and, in stopping the transmission of power, the release of the clutch surfaces is made directly dependent upon the prior engagement of the brake surfaces. However, for lowering the load, the brake surfaces can be released independently of the engagement of the clutch surfaces. By virtue of this interdependent relation between the clutch and brake operations, it is functionally impossible to lose control of the hoisting drum between the engaging of the clutch surfaces and the releasing of the brake surfaces, or between the engaging of the brake surfaces and the releasing of the clutch surfaces.

Another object of the invention is to provide such a clutch and brake mechanism in which all of the control operations are performed by axial shifting movements of driving, driven and brake members.

Another object of the invention is to provide improved clutch and brake mechanism in which the release of the brake surfaces for lowering the load at a controlled speed is accomplished by shifting the brake member out of engagement with the driven member.

Another object is to provide such clutch and brake mechanism in which the brake member and the driving member are caused to shift concurrently in the same direction, in the operation of shifting the brake member out of engagement with the driven member for lowering the load at a controlled speed.

Another object of the invention is to provide such a clutch and brake mechanism in which all of the control operations can be performed through the instrumentality of a single control lever.

Another object of the invention is to provide such a clutch and brake mechanism in which the driving, driven and brake members are in the form of coacting cones.

Another object of the invention is to provide such a clutch and brake mechanism in which the brake surfaces exert a braking force against either direction of rotation of the driven member. Hence this clutch and brake mechanism can be employed to handle a load which may act in either direction.

Another object of the invention is to provide such a clutch and brake mechanism embodying improved means for preventing the torque load imposed on the driving member or on the brake member from binding the shifting movement of said members.

Another object is to provide an improved toggle type of control apparatus for controlling the clutch and brake mechanism.

Other objects and advantages of the invention will appear from the following detail description of certain preferred embodiments thereof. In the accompanying drawings illustrating such embodiments:

Figure 1 is a fragmentary side elevational view showing one embodiment of my improved clutch and brake mechanism mounted on the rear end of a tractor;

Figure 2 is a plan view of such embodiment;

Figure 3 is an axial sectional view thereof taken approximately on the plane of the line 3—3 of Figure 2;

Figures 4 and 5 are detail sectional views taken on the planes of the lines 4—4 and 5—5 of Figure 2;

Figure 6 is a detail sectional view taken on the plane of the line 6—6 of Figure 3;

Figures 7, 8 and 9 are diagrammatic views illustrating the operation of the mechanism;

Figure 10 is a fragmentary axial sectional view of another embodiment of my improved clutch and brake mechanism;

Figure 11 is a detail sectional view thereof;

Figure 12 is a fragmentary sectional view showing the operating relation of the clutch and brake surfaces when the brake surfaces have been released for lowering the load;

Figure 13 is a fragmentary side elevational view showing another embodiment of my invention mounted on the rear end of a tractor;

Figure 14 is a fragmentary axial sectional view through such latter embodiment;

Figure 15 is a detail sectional view taken on the plane of the line 15—15 of Figure 14;

Figure 16 is a detail sectional view illustrating the manner in which the control connection for said latter embodiment is extended into the gear housing;

Figure 17 is a side elevational view of the toggle control apparatus for controlling the clutch and brake mechanism; and Figure 18 is a vertical sectional view thereof taken approximately on the plane of the line 18—18 of Figure 17.

Referring to Figure 1, the transmission case of the tractor is indicated at 21, and the operator's seat mounted thereon indicated at 22. The power hoist unit 23 comprises a gear housing 24, a cable drum 25 on which a cable 26 winds, and a clutch and brake assembly 27 disposed above the cable drum. The gear housing 24 is detachably bolted to the transmission case 21 and is adapted to have a power take-off connection with the power transmitting mechanism therein. The clutch and brake mechanism is controlled through the manipulation of a control lever 28 which is disposed in proximity to the operator's seat 22 and which is mounted on the upper end of a control shaft 29, the latter being supported in a bearing bracket 31 at its upper end, and having its lower end extending into the gear housing 24 through a bearing boss 32.

Referring to Figure 3, any desired type of speed reducing gearing can be provided in the housing 24. In the illustrative embodiment shown, the power take-off shaft 35, extending from the transmission case 21, is provided with a bevel pinion 36 at its rear end which meshes with a bevel gear 37 mounted on a vertical countershaft 38. Secured to this countershaft is a spur pinion 39 which drives the spur gear 41 that is keyed to the vertically extending drive shaft 42. Said drive shaft is hollow for having a reciprocable control rod extend therethrough, as will be later described. The drive shaft has its lower portion journaled in a ball bearing 43 carried by the housing 24, and extends upwardly therefrom through a stationary hollow trunnion or quill 44 which is formed integral with the housing 24 or is rigidly secured thereto. The hoisting drum 25 and the rotatable elements of the clutch and brake assembly 27 are journaled on the hollow trunnion 44 through the medium of tapered roller bearings 45 and 46 which are interposed between said trunnion and the upper and lower ends of the hoisting drum, said bearings serving to carry radial and thrust loads. The bearings are held in place by a nut 47 which screws over a thread on the upper portion of the hollow trunnion.

The fundamental elements of the combined clutch and brake mechanism 27 comprise a driving member 49, a driven member 51 and a brake member 52. The driving member 49 is in the form of an upper male cone which rotates constantly with the drive shaft 42 and which is capable of axial shifting movement thereon. The driven member 51 is in the form of an outer female cone which rotates with the hoisting drum 25 and which is also capable of axial shifting movement. The brake member 52 is in the form of a lower male cone which is non-rotatably secured to the upper end of the hollow trunnion 44, and which is also capable of axial shifting movement. The brake member 52 is of two-part construction, the secondary part consisting of a torque sustaining spider 53 which is keyed to the trunnion 44. The cone portion of the brake member is connected with said spider through resilient or flexible means which provides for the axial shifting movement of said cone portion, as will be presently described. The coacting clutch surfaces $C^1$ and $C^2$ on the driving member 49 and on the driven member 51 constitute the clutch portion of the mechanism, and the coacting brake surfaces B¹ and B² on the brake member 52 and on the driven member 51 constitute the brake portion of the mechanism. The surfaces C² and B² are shown in the form of renewable friction facings secured to the inner surface of the driven cone 51, but it will be understood that, if desired, these friction facings may be secured to the outer surfaces of the driving and brake cones instead.

The hoisting drum 25 comprises an upper extension flange or plate 55 which is secured by bolts 56 to a short flange 57 at the upper end of the drum. A driven relation is established between the driven cone 51 and said plate 55 through a series of short studs 58 (Figure 5) which are mounted at circumferentially spaced points in the outer portion of the plate 55. These studs have tapered lower ends 59 which are riveted in the plate 55, and slidably movable over the upper ends of said studs are guide sleeves or thimbles 61 which are rigidly secured in a flange 62 projecting outwardly from the lower portion of the driven cone 51. This coupled relation between the driven cone and the hoisting drum compels both to rotate together as a unit, while permitting axial shifting movement of the driven cone relatively to the hoisting drum. Also rigidly anchored in the plate 55 is a series of circumferentially spaced guide rods 63 which extend upwardly through openings in the flange 62 projecting from the lower portion of the driven cone. If desired, these rods might be utilized to establish a torque transmitting relation between the driven cone and the hoisting drum. However, in the preferred arrangement shown, the primary function of these rods is to support an upper spring cage comprising two rings 65 and 66 which surround the driven cone 51. The guide rods extend through apertures in inwardly directed flanges of both rings and receive nuts 67 on their threaded upper ends for adjusting the vertical position of the upper ring 65 on said rods. This upper ring serves as a fixed abutment surface for a plurality of compression springs 68 which are confined between the two rings at spaced points around the spring cage. Such springs tend to force the lower thrust ring 66 downwardly in its guided mounting on the rods 63, which downward pressure is transmitted to the axially shiftable driven cone 51 through the instrumentality of a plurality of screws 69 which thread down through the peripheral flange 62 of the driven cone (Figure 4). The thrust ring 66 bears directly on the heads of the screws 69, tending to shift the driven cone member 51 downwardly for holding its brake surface B² in engagement with the brake surface B¹ of the brake cone 52. It will be evident that the pressure exerted by the springs 68 for normally holding these brake surfaces in engagement can be adjusted as desired by screwing the nuts 67 upwardly or downwardly along the guide rods 63 for adjusting the spacing between the rings 65 and 66. The lower ends 69' of the screws 69 constitute adjustable abutment stops adapted to engage the upper surface of the plate 55 for limiting the downward movement of the driven cone 51 when the brake cone 52 is shifted downwardly out of engagement therewith, as will hereinafter appear. Normally, the lower ends of these screws are spaced slightly out of contact with the plate 55, and as wear occurs in the friction facing material constituting the brake surface B², these screws can be adjusted upwardly to compensate therefor, the screws being maintained in any adjusted relation by the lock nuts 71.

The driving cone 49 has its hub 74 broached for a sliding fit over helical splines 75 formed in the upper end of the drive shaft 42. Such driving connection prevents the torque load imposed on the driving cone from binding the shifting movement of said cone. When using straight splines in such a driving connection, the force necessary to slide the driving cone along said splines under torque load may exceed the pressure required to engage the clutch surfaces. Such binding action or high frictional resistance in the shiftable connection may cause a chattering or grabbing action during the operation of engaging the clutch surfaces C¹ and C². This is avoided by the helically splined connection, in which the direction of inclination of the helical splines 75 with respect to the direction of rotation of the driving shaft 42 is such that as soon as the clutch surfaces establish contact, the torque transmitted through said helical splines establishes an axial shifting force which minimizes or eliminates such binding action. The magnitude of the shifting force created by the helical splines may be varied as desired by changing the angle of inclination of the splines. A large angle of inclination establishes a servo action tending to force the clutch surfaces together, and such angle may be embodied in the present construction, although I deem it preferable in most constructions to employ only such degree of angle as will insure that the friction of the torque load will not impede free sliding motion of the hub 74 along the splines.

The driving cone 49 is shifted axially through the reciprocation of a push-pull rod 77 which extends downwardly through the hollow drive shaft 42. The upper end of said rod is formed with a reduced portion 77' on which a cap 78 is mounted, the cap being secured to the shaft by the key 79 and nut 81, whereby the cap and shaft rotate and shift together. The lower portion of this cap or shifter head 78 is internally threaded for receiving the threaded upper portion 74' of the hub 74. The lower portion of the cap is split vertically and is provided with ears 82 for receiving a transverse clamping bolt 83 by which the cap can be clamped to the threaded hub portion 74' in any adjusted relation of the cap and hub. By virtue of this adjustable relation, as wear occurs in the friction facing C² of the clutch surfaces, the threaded hub portion 74' can be screwed upwardly in the cap 78 for raising the driving cone 49 an appropriate amount to compensate for such wear. In Figure 3 the driving cone 49 is illustrated in its neutral position, and it will be evident that upward pushing motion transmitted through the control rod 77 to the cap 78 will be operative to shift said driving cone upwardly from this neutral position into clutching position, with the clutch surfaces of the driving and driven cones engaged. Downward pulling motion transmitted through the control rod 77 for pulling of the shifter head 78 downwardly from the neutral position shown, is transmitted to the brake cone 52 through a plurality of push pins 84. These push pins are slidably mounted in vertical bores in the hub 74, and serve as a one-way pushing connection for transmitting downward motion of the shiftable head 78 to the brake cone. Lubricant can be supplied to the interior of the shiftable head or cap 78 and to said push pins through a lubricating nipple 75

86, the push-pull rod 77 comprising an enlarged upper portion having a snug sliding fit within the upper portion of the hollow shaft 42 for retaining said lubricant against leakage down along the rod.

Referring now to the brake cone 52, the web 89 of this cone is formed with a central hub 91 within which is mounted an anti-friction thrust bearing 92. Seating on the inner race of said bearing is an axially shiftable thrust ring 93 which is broached to fit the helical splines 75 of the drive shaft, whereby the thrust ring revolves with said shaft. The lower ends of the push pins 84 abut the thrust ring 93, and transmit downward motion through said ring and through the bearing 92 to the brake cone 52 for moving the latter downwardly out of engagement with the driven cone 51. The object of transmitting such downward thrusting movement to the brake cone through the push pins 84 rather than through the hub 74 of the driving cone is to insure that a fixed distance will be maintained between the shiftable head 78 and the brake cone in such downward thrusting movement, irrespective of the vertical adjustment of the driving cone to different positions to compensate for wear of the clutch lining C². Thus, the release of the brake surfaces will always occur at substantially the same point in the downward thrusting movement of the push-pull rod 77 notwithstanding the fact that the threaded hub portion 74' of the driving cone may have been adjusted upwardly or downwardly to different positions in the shiftable head 78.

Upward pressure is continuously exerted on the brake cone 52 by a series of compression springs 95 which are mounted in angularly spaced pockets formed in the hub portion of the torque sustaining spider 53, the upward motion of said brake cone in response to this spring pressure being limited to a predetermined normal position established by limiting stops carried by the spider 53. The hub of said spider is non-rotatably anchored to the upper end of the hollow trunnion 44 by keys or splines 97, and may also be secured against shifting movement thereon by a set screw or other suitable securing means. The spider comprises two oppositely extending arms 53', each of which carries a pair of bolts 99 (Figure 6) extending upwardly through spaced holes 101 in the web portion 89 of the brake cone. The bolts pass through a stop plate or strap 102 which is adapted to be engaged by the top surface of the web 89, whereby to predetermine the normal position to which the brake cone is urged upwardly by the springs 95. There are a considerable number of the springs 95 and their aggregate pressure is considerably larger than the aggregate pressure of the springs 68. Hence, the brake cone 52 is normally held in its raised position in contact with the limiting stops 102, and said cone is not forced downwardly from its normal position when the driven cone moves downwardly into braking contact therewith under the pressure of the springs 68.

Braking torque is transmitted from the brake cone 52 to the spider 53 through a flexible coupling ring 103 which is composed of a plurality of thin steel laminations. This ring is rigidly clamped to the two diametrically opposite spider arms 53' by a clamping plate 104 (Figure 6) which is forced downwardly against the ring by spacing sleeves 105 confined between said clamping plate and the upper stop plate 102. These sleeves have sufficient play in the openings 101 so that no torque is transmitted from the web portion 89 to said sleeves. The coupling ring 103 is attached to the web portion 89 of the brake cone at two diametrically opposite points which are spaced at right angles to the spider arms 53'. One of these points of attachment is illustrated in Figure 4, from which it will be seen that two bolts 106 pass through said web portion and coupling ring, and through clamping plates 107 which engage above and below the coupling ring. With the brake cone 52 standing in normal position, the two diametrically opposite points of the coupling ring which are attached by the bolts 106 are preferably flexed upward slightly above the two points which are attached by the bolts 99, so that the entire flexure of the ring is above and below a neutral plane. The coupling ring is sufficiently rigid in the horizontal plane to transmit the braking torque from the brake cone 52 to the spider 53, and also to hold the brake 52 properly centered so that the bearing 92 will hold the drive shaft 42 in proper alignment. At the same time, however, the coupling ring is sufficiently resilient or flexible in the vertical planes between its point of attachment to accommodate the downward shifting movement of the brake cone in the operation of separating said brake cone from the driven cone for lowering the load at a controlled speed. This feature of accommodating the axial shifting movement of the brake cone 52 by flexure of the yieldable coupling ring 103 avoids the binding action which would inherently follow if it were attempted to slide the brake cone along a straight splined connection under heavy torque load. As previously described in regard to the helically splined driving connection for the driving cone 49, any shiftable cone element is likely to chatter or grab when it is moved into torque sustaining contact with its companion conical element along a conventional straight splined connection. Such would also be true of the brake cone 52, particularly when moving such cone back into braking engagement with the driven cone 51, which would make it difficult to exercise a delicate control over the lowering and stopping of a load. However, the provision for axial shifting movement through the flexure of the flexible coupling ring 103 avoids the high frictional resistance of a conventional splined connection operating under load, and avoids the aforementioned chattering and grabbing action.

Referring now to the mechanism for transmitting motion from the control shaft 29 to the push-pull rod 77, it will be seen from Figure 3 that the lower end of said latter rod enters the bearing cage 111 which is mounted in the gear housing 24 below the drive shaft 42. Enclosed within said cage is a suitable anti-friction thrust bearing 112 of a type capable of transmitting thrust in each direction, the inner race of said bearing being clamped between a shoulder 113 on the push-pull rod and a nut 114 screwing over the lower end of the rod. The outer race of said bearing is confined between an inturned flange at the upper end of the cage and an end cap 115 which screws into the lower portion of the cage. Projecting downwardly from said end cap is a heavy screw stud 116 which screws into a threaded boss 117 formed on a closure plate 118 bolted to the gear housing 24. The bearing cage 111 and screw stud 116 are rotated as a unit through the swinging motion of a crank arm 119 which projects from the bearing cage. The outer end of said crank arm is pivotally connected at 121 to a link 122 which extends across the lower portion of the gear housing to a point adjacent the lower end of the control shaft 29. Here this link is pivotally connected through a pin 123 with a crank arm 124 which is secured to the lower end of the shaft 29, such link connection between the crank arms 119 and 124 being illustrated in dotted lines in Figure 2.

When the operator's control lever 28 stands in its neutral intermediate position, as indicated in full lines in Figure 2, the driving, driven and brake members 49, 51 and 52, respectively, occupy the relative positions shown in Figures 3 and 7. At this time, the driving member 49 is spaced out of engagement with the driven member 51, so that the clutch surfaces $C^1$ and $C^2$ are disengaged, but the driven member 51 is held in pressure engagement with the brake member 52 under the action of the springs 68, so that the brake surfaces $B^1$ and $B^2$ are engaged for holding the hoisting drum 25 against rotation.

When the operator desires to transmit power to the hoisting drum 25 for raising the load, he oscillates control lever 28 in a clockwise direction from the neutral position shown in Figure 2. This transmits upward motion to the push-pull rod 77 and moves the driving cone 49 upwardly into engagement with the driven cone 51. In the initial contact between the clutch surfaces $C^1$ and $C^2$ some slippage occurs between these surfaces because at this time the driven member 51 is still being held in braking engagement with the brake member 52. As the upward shifting motion of the driving cone 49 is continued, sufficient pressure is built up between the clutch surfaces to overcome the pressure of the springs 68. Hence, the driven cone 51 is picked up and caused to move concurrently with the driving cone 49, thereby separating the brake surfaces $B^1$ and $B^2$. By virtue of this interdependent relation wherein the brake surfaces are released only after the clutch surfaces are engaged, there is always the assurance that the hoisting drum will receive the necessary driving energy to raise the load before the braking restraint necessary to sustain the load has been released. This power transmitting relation of the three cone members is diagrammatically illustrated in Figure 8.

The operation of interrupting the transmission of power to the hoisting drum, as for bringing the load to rest at the desired elevated point and holding it there, is accomplished by moving the control lever 28 back to its neutral position. In the return motion of the driving cone 49 toward its neutral position, the driven cone 51 will remain clutched thereto under the action of the springs 68 until the lower portion of the driven cone engages the brake cone 52. Thereupon, the pressure of the springs 68 is transferred from the clutch surfaces to the brake surfaces $B^1$ and $B^2$, the driving cone 49 continuing to move down to its neutral position, which physically separates the clutch surfaces $C^1$ and $C^2$. Here again, by virtue of the interdependent relation wherein the release of the clutch surfaces is made directly dependent upon the prior engagement of the brake surfaces, there is always the assurance that the necessary braking restraint will be imposed upon the cable drum to hold the load before the driving energy necessary to raise the load has been released.

When it is desired to lower the load at a controlled speed, governed by the brake surfaces of the mechanism, the operator oscillates the control lever 28 in a counterclockwise direction from the neutral, intermediate position shown in Figure 2. This causes the push-pull rod 77 to be pulled downwardly, thereby moving the clutch cone 49 downwardly and, concurrently therewith, thrusting the push pins 84 downwardly. This transmits downward motion through the thrust bearing 92 to the brake cone 52. The driven cone 51 follows the downward motion of the brake cone a short distance, until the lower ends 69' of the screws 69 (Figure 4) abut the plate 55. Thereupon, further downward movement of the driven cone 51 is arrested, and continued downward movement of the brake cone 52 separates the brake surfaces $B^1$ and $B^2$. This release of the friction contact between said brake surfaces can be performed very gradually so that the reverse rotation of the cable drum 25 can be maintained at any desired speed. The downward movement of the clutch cone 49, concurrently with the downward movement of the brake cone 52, maintains the clutch cone 49 in spaced relation to the driven cone 51 so that no clutching engagement can occur at this time. This relation of the three cone elements is diagrammatically illustrated in Figure 9. Restoration of the parts to their neutral positions follows the return motion of the control lever 28 to its neutral position.

When it is desired to renew the friction facing materials $C^2$ or $B^2$, the two rings 65 and 66 of the spring cage can be connected together by clamps or by any other suitable means so that the entire spring assembly including these rings and the springs 68 can be removed as a unit, preparatory to removing the driven cone 51 for replacing the friction facings thereon. As previously described, adjustment is made for wear of the brake lining $B^2$ by threading the screws 69 upwardly a predetermined distance from the plate 55, which distance may be gauged by the interposition of a feeler strip between the lower ends 69' of said screws and the plate 55; and adjustment is made for wear of the clutch lining $C^2$ by screwing the threaded portion 74' of the clutch cone hub upwardly into the shifter cap 78.

In Figures 10, 11 and 12 I have illustrated another embodiment of clutch and brake mechanism in which the driving, driven and brake members are nested or grouped, one within the other, so that they all lie in substantially the same transverse plane. In this embodiment, the driven member 51 is of two-part construction consisting of the outer section 51$^a$ and the inner section 51$^b$. The outer section 51$^a$ has the clutch lining $C^2$ secured to the inner surface thereof, and the driving cone 49 extends into the annular space between the two driven cone sections 51$^a$ and 51$^b$ to dispose its clutch surface $C^1$ in position to engage said clutch lining. The inner conical section 51$^b$ of the driven member has the brake lining $B^2$ secured to the inner surface thereof, and the brake cone 52 lies within this inner section to dispose its brake surface $B^1$ in position to engage said brake lining. The lower ends of the outer and inner cone sections 51$^a$ and 51$^b$ are provided with radially extending flanges 51$^c$ and 51$^d$, respectively. Referring to Figure 11, the driven member 51 is coupled to the plate 55 of the cable drum through the driving studs 58 and thimbles 61, substantially in the manner described of the preceding embodiment. In this construction, the lower reduced portion of each thimble is riveted to the lower flange 51$^d$ of the inner cone section, and the upper flange 51$^c$ of the outer cone section preferably has a free sliding fit over said thimble, such construction facilitating ready separation of the inner and outer cone sections when it is desired to replace the friction linings thereof. The two flanges $51^c$ and $51^d$ are releasably secured together by the screws 69 and lock nuts 71. The screws 69 pass freely through enlarged openings 70 in the upper flange $51^d$ and thread through tapped openings in the lower flange $51^d$. The lock nuts 71 screw downwardly against the upper flange $51^c$ and clamp both flanges together, the flanges being readily separable, however, by merely releasing the lock nuts and removing the screws from the lower flange. Holes 126 in the lower flange $51^d$ provide for an induced circulation of air downwardly through the space between the driving cone 49 and the driven cone section $51^b$ for cooling the clutch and brake surfaces.

The brake cone 52 may be coupled to the torque sustaining spider 53 through a flexible coupling ring 103 in substantially the arrangement previously described in connection wtih Figures 3, 4 and 6. However, as illustrative of another method of coupling the brake cone and spider together, I have illustrated a construction employing rubber bushings 128 which can accommodate shifting movement of the brake cone under torque load by flexure of the rubber. A plurality of these rubber bushings are operatively connected between the brake cone and spider at angularly spaced points, the spider having a corresponding number of arms 53' for the several bushings. Each of these spider arms is provided with a tapered hole for receiving the tapered shank 129' of a stud 129, the tapered shank being rigidly clamped in the spider arm by a nut 131 screwing over a reduced threaded end of the stud. The rubber bushing 128 surrounds the stud 129, and is in turn surrounded by a metallic sleeve 132. The rubber is secured to the stud and to the sleeve either by vulcanization or by pressure maintained within the rubber, the bushing being axially compressed between a boss 133 extending upwardly from the spider arm and a ring 134 mounted on the upper portion of the stud. Formed in the web portion 89 of the brake cone 52 is a tubular boss 135 for each of the rubber bushings, this boss having a free sliding fit over the metallic sleeve 132 which surrounds the bushing. For limiting the upward movement of the brake cone 52 to the predetermined normal position illustrated, each of the studs 129 is provided with a stop disc 136 which seats against the shoulder 137 on the stud and is held in place against said shoulder by a nut 138 screwing over the reduced upper end of the stud. The edges of these stop discs overlie the upper ends of the tubular bosses 135 and function as stop shoulders to be engaged by said bosses for limiting the upward shifting movement of the brake cone in response to the pressure of the springs 95. The remainder of the structure in this embodiment is the same as in the preceding embodiment.

The operation is the same as described of the preceding embodiment, upward movement of the driving cone 49 into its power transmitting position causing the clutch surfaces $C^1$ and $C^2$ to engage and thereafter causing the brake surfaces $B^1$ and $B^2$ to disengage in interdependent relation, and downward movement of said driving cone back to normal position causing the brake surfaces $B^1$ and $B^2$ to engage and thereafter causing the clutch surfaces $C^1$ and $C^2$ to disengage in interdependent relation. In releasing the brake surfaces for lowering the load at a controlled speed, the brake cone 52 is pushed downwardly from its normal position against the action of the springs 95, whereby the brake surfaces $B^1$ and $B^2$ are separated or the pressure of their engagement is reduced, as illustrated in exaggerated relation in Figure 12. When the brake surfaces $B^1$ and $B^2$ are in contact and under torque load, shifting movement of the brake cone 52 is accommodated substantially entirely by flexure of the rubber bushings 128, because at this time the metal to metal sliding contact between the tubular bosses 135 and sleeves 132 has a relatively high frictional resistance. In the event the brake cone is shifted to a completely released position where it carries no braking torque whatever, all shifting motion of the cone in such completely released relation can be accommodated by the metal to metal sliding contact between the tubular bosses 135 and sleeves 132. Hence, there is no binding action tending to restrict shifting movement of the brake at any time, and, therefore, there is no chattering or grabbing action of the brake mechanism. The rubber bushings 128 have sufficient rigidity against transverse flexure to hold the brake cone 52 properly centered so that the bearing 92 will hold the drive shaft 42 in proper alignment. This construction employing the rubber bushings for coupling the brake cone to the torque sustaining spider can also be employed in the construction illustrated in Figure 3 in lieu of the flexible coupling ring 103.

In Figure 14 I have illustrated another modified embodiment in which both the driving cone 49 and the brake cone 52 are provided with flexible coupling means for coupling said cones to individual torque sustaining spiders. Another feature of this modified construction is the fact that the driven member 51 is divided into a clutch section $51^e$ and a brake section $51^f$, which sections are independently adjustable to facilitate the operation of adjusting the mechanism for wear of the clutch and brake linings. The construction and arrangement of the brake cone 52, its torque sustaining spider 53 and the interposed flexible coupling ring 103, are substantially the same as previously described of the embodiment illustrated in Figure 3. Figure 14 is illustrated as a three-quarter section for the purpose of illustrating the bolted attachment of the flexible coupling ring 103 to the brake cone and to the torque sustaining spider. In this instance, the bolts 99 are illustrated in the form of cap screws threading into tapped holes in the outer ends of the spider arms 53'.

The driving cone 49 is illustrated as being of the same diameter as the brake cone 52, although it will be understood that it may be made of larger or smaller diameter, if desired. In this regard, the clutch surfaces $C^1$ and $C^2$ and the brake surfaces $B^1$ and $B^2$ can be made of different lengths and can also be made of different relative diameters in each of the embodiments shown, for the purpose of adapting the clutch and brake mechanism to different operating conditions. For example, in those hoist stipulations wherein the load is generally tripped or released at an elevated point, the clutch surfaces have to withstand a heavier duty than the brake surfaces, and for such situations the clutch surfaces can be made of larger effective area. On the other hand, in those hoist situations wherein the load is generally lowered at a controlled speed, the brake surfaces have to sustain a very heavy duty and for these situations the brake surfaces can be made of relatively large effective area. In the modified construction of Figure 14, the driving cone 49 is provided with a torque sustaining spider 50 which has its hub 154 secured to the upper end of the drive shaft 42 by keys or straight splines 155 and by a set screw 156. This spider is coupled to the driving cone through a flexible coupling ring 103' which is bolted to the spider and to the driving cone in the same manner previously described of the embodiment shown in Figure 3. Strap plates 157 may be interposed between the heads of each pair of cap screws 99' and the bushings 105 to provide a non-rotative surface for the heads of the screws to bear on so that they will not tend to work loose. In this construction the thrust ring 93 is rotatable relatively to the splines 155.

The clutch and brake sections 51e and 51f of the driven member are each provided with outwardly extending radial flanges 51g and 51h respectively. These flanges are tied together at angularly spaced points by tie bolts 157, whereby the two sections 51e and 51f normally function as a unitary driven member 51. Nuts 158 screwing over these tie bolts and engaging the upper and lower sides of the flange 51g determine the position of the section 51e with respect to the bolts, and nuts 159 screwing over the bolts and engaging the upper and lower sides of the flange 51h determine the position of the brake section 51f with respect to the tie bolts. The compression springs 68 are confined between two angle shaped rings 65' and 66', and the upper ends of the tie bolts 157 have riveted attachment to the lower ring 66', as indicated at 161. The lower ends 157' of the tie bolts serve as abutment stops which are normally slightly spaced from the top surface of the hoisting drum plate 55. To adjust the clutch surfaces C¹ and C², the driving cone 49 is first shifted upwardly to the upper limit of its clutch engaging movement and the nuts 158 are then manipulated to space the lower ends 157' of the tie rods a predetermined distance above the plate 55, as determined by the interposition of a feeler strip. To adjust the brake surfaces B¹ and B², the driving cone 49 is restored to normal position and the nuts 159 are then manipulated to space the lower ends of the tie rods a predetermined distance above the plate 55, as determined by the interposition of a different feeler strip. The spacing which determines the proper adjustment of the clutch surfaces will be several times the spacing that determines the proper adjustment of the brake surfaces. This method of adjusting the clutch and brake surfaces is advantageous in that it can be performed very readily, and both adjustments can be mathematically gauged rather than being dependent upon the operator's judgement.

The clutch and brake mechanism is enclosed within a cylindrical sheet metal housing 163 which has its upper portion rigidly secured to the upper ring 65' and which has its lower portion rigidly secured to the plate 55 by a plurality of screws 164 threading into said plate. Openings 165 are provided in said housing opposite each tie bolt 157 for affording access to the nuts 158 and 159. The clutch and brake sections 51e and 51f of the driven member are coupled to the cable drum through the housing 163. This coupled connection is established by a plurality of vertically extending key bars 166 which are secured at spaced points around the inside of the housing by the rivets or bolts 167. As shown in Figure 15, the flanges 51g and 51h are notched out at each of these key bars and have correspondingly shaped guide members 168 and 169 rigidly secured to said flanges, these guide members affording an extensive area of guiding contact with the key bars 166. The top of the clutch and brake mechanism is preferably enclosed by a removal sheet metal cover 171 which can have snap engagement with the lower ring 66' of the spring cage. Adequate circulation of air to the clutch and brake surfaces is provided for by the openings 172 in the plate 55 and by the openings 165 in the housing 163.

This modified construction of clutch and brake mechanism can be controlled by the same type of control mechanism illustrated in Figures 1, 2 and 3. However, I have shown a modified type of control apparatus which possesses certain advantages over the control apparatus illustrated in Figures 1, 2 and 3, and which may be employed in connection with the clutch and brake mechanisms of Figures 1, 2, 3 and 10, if desired. In this modified type of control apparatus, the push-pull rod 177 is held against rotation in the hollow drive shaft 42 and has thrust transmitting connection with the hub or shifter head 178 of the driving cone 49 through a suitable anti-friction thrust bearing 179 capable of transmitting thrust in both directions. The inner race of said bearing is clamped between the shoulder 181 on the rod 177 and a nut 182 screwing over the upper end of said rod. The outer race of the bearing is clamped between an internal shoulder in the shifter head 178 and a closure cap 184 which is secured to the shifter head by screws 185. The thrust bearing 179 can be lubricated through the nipple 186, and such lubricant is retained within the bearing by a sealing ring 187 confined between the push-pull rod 177 and the shifter head 178. Downward motion of the shifter head is transmitted to the brake cone through push pins 84 which extend downwardly through the hub 154 of the spider 153, such brake releasing operation being performed in the same manner previously described.

Referring to Figure 16, the push-pull rod 177 extends out through a boss 189 in the bottom plate 118 of the gear housing 24, such boss being provided with a gland packing 191 to prevent the leakage of lubricant from the gear housing. As a further precaution against leakage of lubricant, a tube 192 has its lower end tightly secured within an upwardly extending boss 193 and has its upper portion extending up into the hollow shaft 42 around the push-pull rod 177, the upper end of said tube terminating above the lubricant level within the gear housing. This construction minimizes the amount of lubricant which can reach the gland packing 191. The lower end of the rod 177 is splayed on opposite sides to form a tongue which extends down into a slotted intermediate portion of a transverse actuating lever 195 which is disposed below the gear housing. The end of the rod is pivoted to said lever on a transverse pivot pin 196. Where the push-pull rod extends out through the bottom of the gear housing, as in this embodiment of control mechanism, it is desirable that such rod be non-rotating to minimize the leakage of lubricant downwardly along the rod. The rear end of the lever 195 is pivotally supported between the lower ends of a pair of parallel links 197 (Figure 13), the upper ends of said links are pivotally supported on a lug 198 projecting from the gear housing 24. The front end of the lever is pivotally connected at 199 to a rod 201 which extends upwardly along one side of the gear housing to establish operative connection with the control lever 202. Such operative connection might be established through a crank arm swinging with the operating lever, but I preferably employ an improved construction of toggle apparatus such as is illustrated in Figures 17 and 18. This toggle apparatus 203 is enclosed in a housing 204 which is secured by the screws 205 to a supporting standard 206. This standard consists of a plate having one vertical margin bent at right angles to form a stiffening flange, the standard being suitably bolted to the front portion of the gear housing 24. The toggle housing 204 is mounted on said standard so as to dispose the control lever 202 to the rear and to one side of the operator's seat 22 for pivotal motion at right angles to said seat, but, if desired, the toggle housing may be mounted to dispose the control lever for pivotal motion parallel to the seat. The toggle apparatus comprises a slide bar 208 which has its ends guided for vertical reciprocation in channel-shaped end guides 209 formed in the upper and lower ends of the housing 204. The back surface of the slide bar may bear directly against the adjacent surface of the standard 206, or it may bear against a back wall constituting a part of the housing 204. The rod 201 threads into the lower end of the slide bar 208 and is locked therein by a check nut 211, whereby the effective length of said rod can be adjusted for adjusting the control apparatus. The front edge of the slide bar is formed with a relatively long recess 212 which terminates at opposite ends in cylindrical sockets 213 and 214. The sockets receive the cylindrical ends 217 and 218 of two toggle links 215 and 216. The inner ends of said links are mounted on pivot pins 221 and 222 carried by a rocker member 223. The rocker is secured to a transverse shaft 224 which is journaled in the side bearing bosses 225 and 226 of the housing and which has the control lever 202 mounted on its outer end. The rocker preferably consists of a triangular casting having slots milled in its ends to accommodate the toggle links, although it may comprise two spaced plates assembled on opposite sides of the links. A bowed leaf spring 228 is centrally secured to the housing 204 by the rivet 229, and has its ends pressing inwardly against the outer ends of the toggle links 215, 216 for holding the ends of said links in line with the cylindrical sockets 213, 214. The cylindrical ends 217, 218 of the toggle links are capable of sliding into and out of these cylindrical sockets 213, 214 in the operation of the toggle mechanism, but are always held in line with these sockets by the leaf spring 228.

It will be noted that the toggle pivot 221 is located at a greater radial distance from the axis of the rocker than is the toggle pivot 222. By this arrangement, for the same range of operating movement of the control lever 202 to either side of neutral position, a greater degree of throw is imparted to the slide bar 208 by the toggle link 215 than is imparted to said slide bar by the toggle link 216. Such differential movement is desirable in the present clutch and brake mechanism for giving the greater range of movement necessary for thrusting the driving cone 49 upwardly in the operation of engaging the clutch surfaces and thereafter releasing the brake surfaces, and, in the other direction of operation, for giving the greater mechanical advantage which is desirable for shifting the brake cone 52 to released position. In situations where it is desired to have the range of sliding movement of the bar 208 the same in either direction from neutral position, the toggle pivot 221 or 222 can be located at the same radial distance from the axis of the rocker member. Motion of the rocker member to either extreme position carries the toggle pivot 221 or 222 into or past a dead-center relation with respect to a line extended from the axis of the rocker member to the center of the rounded end of the thrusting toggle link, whereby the control lever 202 can be retained in either extreme position without effort. Due to the angular relation between the pivot axes 221 and 222 and the axis of the rocker 223, swinging movement of the rocker in either direction will cause the retreating toggle link to move faster than the thrusting toggle link. However, this is accommodated by the fact that the rounded end of the retreating link can withdraw from its cylindrical socket, as previously described.

In the operation of this control apparatus, the throw of the control lever 202 to one extreme position or the other is operative through the toggle apparatus to oscillate the actuating lever 195 upwardly or downwardly for transmitting corresponding motion to the push-pull rod 177. Such motion of the rod operates the clutch and brake mechanism in the same manner previously described in connection with Figures 1, 2 and 3.

While I have illustrated and described what I regard to be the preferred embodiments of my invention, nevertheless it will be understood that such are merely exemplary and that numerous modifications and rearrangements may be made therein without departing from the essence of the invention. For example, I have shown three separate types of devices for preventing chattering or grabbing of the clutch or brake surfaces in the engagement of these surfaces, namely, the helical spline device 75, the flexible coupling ring device 103 and the rubber bushing device 128. It is within the scope of my invention to employ either one of these devices in association with the clutch portion of the mechanism, and to employ either one of these devices in association with the brake portion of the mechanism.

I claim:

1. In combination, a driving member, a driven member, a clutch for operatively connecting these two members together, movable brake means for the driven member, means whereby the release of said brake means is made dependent upon the prior engagement of said clutch means, and means whereby to release the brake means only when said clutch is inoperative.

2. In combination, a driving member, a driven member, a clutch for operatively connecting these two members, shiftable brake means for the driven member, control means, such interlock between the aforesaid elements that there is no intermediate disengaged condition of the driven member between the two engagements thereof, and means whereby to release the brake means only when said clutch is inoperative.

3. In combination, a shiftable braking member, a driven member adapted to engage said braking member, a driving member, a clutch for engagement between the driving member and the driven member, means whereby the pressure of said engagement shifts said driven member out of engagement with said braking member, control means for said clutch, and means whereby said control means causes shifting movement of said braking member independently of engagement between said driving and driven members.

4. In combined clutch and brake mechanism, the combination of a pair of coacting clutch surfaces, a pair of normally engaging, coacting brake surfaces both of which are movable, means establishing an interdependent relation between said surfaces whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

5. In combination, driving and driven members adapted to have clutch engagement, a shiftable brake member adapted to have engagement with said driven member, and means effective in starting the transmission of power for causing said driving and driven members to engage before said driven and brake members separate.

6. In combination, driving and driven members adapted to have clutch engagement, one of said members being shiftable, a shiftable brake member, and means effective in stopping the transmission of power for causing said driven and brake members to engage before said driving and driven members separate.

7. In combination, a shiftable brake member, a shiftable driven member adapted to engage said brake member, a driving member shiftable into clutching engagement with said driven member and operable by the pressure of said clutching engagement to shift said driven member out of engagement with said brake member, and means for shifting said brake member out of engagement with said driven member.

8. In combination, driving and driven members, one of which is shiftable, a shiftable brake member, control means for causing clutching engagement between said driving and driven members and for causing braking engagement between said driven and brake members, and means for preventing the torque imposed on one of said shiftable members from binding the shifting movement of said member.

9. In combination, driving and driven members, one of which is shiftable, a shiftable brake member, control means for causing clutching engagement between said driving and driven members and for causing braking engagement between said driven and brake members, and yieldable means in torque transmitting relation to one of said shiftable members adapted to accommodate shifting movement of said member by flexure of said yieldable means.

10. In combination, driving, driven and brake members, one of which is shiftable, control means for causing clutching engagement between said driving and driven members and for causing braking engagement between said driven and brake members, and a flexible metallic coupling ring in torque transmitting relation to said shiftable member adapted to accommodate shifting movement of said member by flexure of said device.

11. In combination, driving and driven members, a shiftable brake member, control means for causing clutching engagement between said driving and driven members and for causing braking engagement between said driven and brake members, and a rubber bushing in torque transmitting relation to said shiftable brake member adapted to accommodate shifting movement of said brake member by flexure of said bushing.

12. In clutch and brake mechanism, the combination of driving, driven and brake members, coacting clutch surfaces on said driving and driven members, coacting brake surfaces on said driven and brake members, said driving and brake members being capable of axial shifting movement, a helical spline in torque transmitting relation to one of said latter members, and control means for controlling the engagement of said clutch surfaces and said brake surfaces.

13. In combination, a driven member, spring means tending to shift said driven member in one direction, a brake member, spring means tending to shift said brake member in the opposite direction, said driven and brake members being normally held in cooperative engagement, and a shiftable driving member operative to effect clutching engagement with said driven member and to shift said driven member out of engagement with said brake member under the pressure of said clutching engagement.

14. In combination, driving, driven and brake members, spring means tending to shift said driven member in one direction, spring means tending to shift said brake member in the opposite direction, and control means for controlling the clutching engagement between said driving and driven members and for controlling the braking engagement between said driven and brake members.

15. In clutch and brake mechanism, the combination of a cable drum, a hollow trunnion extending through said drum, a drive shaft extending through said hollow trunnion, a driven member connected with said drum, a brake member connected with said hollow trunnion, a driving member connected with said drive shaft, cooperating clutch surfaces on said driving and driven members, cooperating brake surfaces on said driven and brake members, and control means for controlling the engagement of said surfaces.

16. In clutch and brake mechanism, the combination of a hollow trunnion, a cable drum rotatably mounted on said trunnion, a drive shaft extending through said trunnion, a brake element non-rotatably connected with said hollow trunnion, and means for selectively clutching said cable drum to said drive shaft or to said brake element.

17. In combination, driving and driven elements concentrically disposed one within the other, a driving member connected with said driving element, a driven member connected with said driven element, a shiftable brake member, and control means for controlling clutching engagement between said driving and driven members and for controlling braking engagement between said driven and brake members, and effective in starting the transmission of power for causing said driving and driven members to engage before said driven and brake members separate.

18. In combination, driving, driven and brake members, said driven member and another of said members being shiftable, a gear housing, a hollow shaft extending from said gear housing and connecting with one of said members, and control mechanism comprising a motion transmitting connection operative through said gear housing and through said hollow shaft for transmitting positive shifting motion to both of said shiftable members.

19. In combination, driving, driven and brake members, two of said members being shiftable, a shifter device operatively connected to transmit shifting movement to one of said shiftable members, and a push pin extending through said latter shiftable member for transmitting shifting movement from said shifter device to the other of said shiftable members.

20. In combination, driving, driven and brake members, two of said members being capable of axial shifting movement, a shifter device, means connecting one of said shiftable members with said shifter device providing for axial adjustment of said member relatively to said device, and a push pin extending through said latter shiftable member for transmitting shifting motion from said shifter device to the other shiftable member.

21. In clutch and brake mechanism, the combination of a conical driven member adapted for axial shifting movement, conical driving and brake members cooperating therewith, a rotatable mounting member, means establishing a driving relation between said driven member and said mounting member comprising driving studs carried by one of said members and sleeves carried by the other of said members engaging over said studs, guide rods extending from said mounting member, a pair of rings mounted on said guide rods, compression springs confined between said rings, one of said rings transmitting the thrusting pressure of said springs to said driven member, and adjustable stop means for limiting the shifting movement of said driven member.

22. In clutch and brake mechanism, the combination of driving, driven and brake members, coacting clutch surfaces on said driving and driven members, coacting brake surfaces on said driven and brake members, said driven member comprising a mounting element and a shiftable element, adjustable stop means for limiting the shifting movement of said shiftable element relatively to said mounting element, and control means for controlling the engagement of said clutch and brake surfaces.

23. In clutch and brake mechanism, the combination of a driving member, a driven member and a brake member nested concentrically in substantially the same transverse plane, said brake member being capable of axial shifting movement, coacting clutch surfaces on said driving and driven members, coacting brake surfaces on said driven and brake members, and control means for controlling the engagement and release of said surfaces.

24. In clutch and brake mechanism, the combination of a driving member, a driven member and a brake member, means effective in starting the transmission of power for causing said driving and driven members to engage before said driven and brake members separate, said driven member carrying a rotatable clutch surface adapted to engage said driving member and carrying a rotatable brake surface adapted to engage said brake member, said clutch and brake surfaces being capable of relative adjusting movement to adjust the operation of said mechanism.

25. In clutch and brake mechanism, the combination of a shiftable clutch cone, a shiftable brake cone, flexible coupling rings connected in torque transmitting relation to said clutch and brake cones adapted to accommodate shifting movement of said cones by flexure of said rings, a driven structure comprising a driven clutch cone and a driven brake cone, means providing for adjustment of the spacing between said driven cones, spring means tending to shift said driven cones in one direction, and control means controlling the engagement between said clutch cones and between said brake cones.

26. In control apparatus, the combination of a member shiftable in opposite directions from a neutral position, a control lever, and oppositely extending toggle connections acting between said lever and said member so that said member is shifted when said lever is oscillated.

27. In control apparatus, the combination of a slide bar shiftable in opposite directions from a neutral position, a control lever, a rocker member actuated by said lever, and a pair of oppositely extending toggle links having their inner ends pivotally connected with said rocker member and having cylindrical outer ends engaging in cylindrical sockets in said slide bar for transmitting thrust to said bar.

28. In control apparatus, the combination of a slide member shiftable in opposite directions from a neutral position, a control lever pivoted for swinging movement in opposite directions from a neutral position, a rocker member actuated by said lever, and a pair of oppositely extending toggle links pivotally connected with said rocker member and adapted to transmit thrust to said slide member, one of said toggle links being pivotally connected with said rocker member at a greater radial distance from the axis of said rocker member than the other link, whereby a greater range of throw is imparted to said slide member in one direction than in the other for an equal range of movement of said control lever to either side of the neutral position.

29. In combination, driving, driven, and brake members, coacting clutch surfaces on said driving and driven members, coacting brake surfaces on said driven and brake members, said driving and brake members being capable of axial shifting motion, control means for controlling the engagement of said coacting surfaces, and means responsive to torque for increasing the pressure of engagement between said coacting clutch surfaces.

30. In combination, coacting driving, driven, and brake members, said driving and brake members being shiftable, control means for controlling the engagement between said members, and servo means responsive to torque for creating pressure between said driving and driven members.

31. In mechanism of the class described, the combination of coacting driving, driven and brake members, said driving and brake members being shiftable in the control of said mechanism, control means for controlling the engagement between said members, and means responsive to torque in said mechanism for assisting one of the control operations of said mechanism.

32. In combination, driving, driven and brake members, said driven member being capable of axial shifting motion, a hollow shaft connecting with one of said members, a rod shiftable in said hollow shaft, and control mechanism operative through said rod for imparting shifting movement to said shiftable member.

33. In combined clutch and brake mechanism, the combination of driving, driven and brake members, said brake member being shiftable, said driving and driven members having coacting clutch surfaces, said driven and brake members having coacting brake surfaces, means establishing an interdependent relation between the parts whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

34. In combination, driving and driven members adapted to have clutch engagement, one of said members being shiftable, a shiftable brake member, and means effective in one control operation for causing said driving and driven members to engage before said driven and brake members separate.

CLARENCE M. EASON.